United States Patent
Baney et al.

(10) Patent No.: US 6,590,666 B2
(45) Date of Patent: Jul. 8, 2003

(54) METHOD AND SYSTEM FOR OPTICAL SPECTRUM ANALYSIS WITH NON-UNIFORM SWEEP RATE CORRECTION

(75) Inventors: Douglas M. Baney, Los Altos, CA (US); Bogdan Szafraniec, Sunnyvale, CA (US)

(73) Assignee: Agilent Technologies Inc., Palo Alto, CA (US)

( * ) Notice: Subject to any disclaimer, the term of this patent is extended or adjusted under 35 U.S.C. 154(b) by 57 days.

(21) Appl. No.: 09/854,070

(22) Filed: May 11, 2001

(65) Prior Publication Data

US 2002/0167670 A1 Nov. 14, 2002

(51) Int. Cl.[7] .................................................. G01B 9/02
(52) U.S. Cl. ........................................................ 356/484
(58) Field of Search ............................... 356/451, 484; 359/191

(56) References Cited

U.S. PATENT DOCUMENTS

| | | | |
|---|---|---|---|
| 4,856,899 A | 8/1989 | Iwaoka et al. | 356/346 |
| 4,905,244 A | * 2/1990 | Wyeth et al. | 372/32 |
| 5,780,843 A | * 7/1998 | Cliche et al. | 250/226 |
| 5,828,061 A | 10/1998 | Kakimoto | 250/237 |
| 6,166,816 A | * 12/2000 | Blake | 250/227.27 |
| 6,204,924 B1 | * 3/2001 | Cyr | 356/364 |
| 6,434,176 B1 | * 8/2002 | Deck | 356/484 |

* cited by examiner

Primary Examiner—Robert H. Kim
Assistant Examiner—Thomas R Artman

(57) ABSTRACT

Heterodyne-based optical spectrum analysis involves measuring the sweep rate of a swept local oscillator signal and then generating an output signal that accounts for non-uniformities in the sweep rate of the swept local oscillator signal. In an embodiment, an input signal is combined with a swept local oscillator signal in an optical coupler and the sweep rate of the swept local oscillator signal is measured in a relative frequency measurement system. The combined optical signal is output from the optical coupler to a receiver and a heterodyne beat signal is generated. The heterodyne beat signal and measured local oscillator frequency sweep rate information are utilized by a signal processor to generate an output signal that is indicative of an optical parameter of the input signal and that accounts for non-uniformities in the sweep rate of the local oscillator signal. Because the actual sweep rate of the swept local oscillator signal is measured during analysis of the input signal, the horizontal scale accuracy of heterodyne-based OSAs is improved.

20 Claims, 12 Drawing Sheets

METHOD AND SYSTEM FOR OPTICAL SPECTRUM ANALYSIS WITH NON-UNIFORM SWEEP RATE CORRECTION

FIELD OF THE INVENTION

The invention relates generally to the field of optical measurements and measuring systems, and more particularly to a method and system for optical spectrum analysis that utilizes optical heterodyne detection.

BACKGROUND OF THE INVENTION

Dense wavelength division multiplexing (DWDM) requires optical spectrum analyzers (OSAs) that have higher spectral resolution than is typically available with current OSAs. For example, grating-based OSAs and autocorrelation-based OSAs encounter mechanical constraints, such as constraints on beam size and the scanning of optical path lengths, which limit the spectral resolution that can be obtained.

As an alternative to grating-based and autocorrelation-based OSAs, optical heterodyne detection systems can be utilized to monitor DWDM systems. For example, optical heterodyne detection systems can be utilized for optical spectrum analysis of an input optical signal. FIG. 1 is a depiction of a prior art heterodyne-based OSA that includes an optical coupler 110 that combines an input signal 102 from an input fiber 104 with a swept local oscillator signal 106 from a local oscillator source 105 via local oscillator fiber 108. The combined optical signal travels on an output fiber 118 and is detected by a heterodyne receiver 112. The heterodyne receiver converts optical radiation from the combined optical signal into an electrical signal. Square law detection results in mixing of the two combined optical signals and produces a heterodyne beat signal at a frequency that is equal to the frequency difference between the combined optical signals. The heterodyne beat signal is processed by a signal processor 116 to determine a characteristic of the input signal, such as frequency, wavelength, or amplitude.

In an ideal heterodyne-based OSA, the local oscillator source produces a local oscillator signal that sweeps over a range of optical frequencies (or wavelengths) at a constant rate (i.e., $d\nu/dt = $ constant, where $\nu$ is the optical frequency). Although a constant sweep rate is ideal, known local oscillator sources produce local oscillator signals that sweep at non-uniform rates. FIG. 2 depicts an example graph of a local oscillator signal 206 that has a non-uniform sweep rate. The non-uniformity of the local oscillator signal sweep rate causes inaccurate frequency measurements of the input signal. FIG. 3 depicts an example input signal spectrum, including multiple DWDM channels 309, which may be input into the heterodyne-based OSA. As depicted in FIG. 3, each of the DWDM channels is separated by a frequency band of the same width. FIG. 4 depicts an example output from a heterodyne-based OSA that results from the non-uniformly swept local oscillator signal depicted in FIG. 2 in relation to the input signal spectrum of FIG. 3. As shown in FIG. 4, the measured spectrum that results from the non-uniformly swept local oscillator signal does not accurately reflect the actual input signal spectrum. Specifically, the non-uniformity in the local oscillator signal sweep rate translates directly into errors in the accuracy of the measured signal spectrum (as indicated by the channels that have a different channel spacing than the channels depicted in FIG. 3).

In view of the need for higher resolution OSAs and the problems caused by the non-uniform sweep rate of local oscillator sources used in heterodyne-based OSAs, what is needed is a heterodyne-based OSA that can correct for the non-uniformities in the sweep rate of a local oscillator source.

SUMMARY OF THE INVENTION

A method and system for heterodyne-based optical spectrum analysis involves measuring the sweep rate of the swept local oscillator signal and then generating an output signal that accounts for non-uniformities in the sweep rate of the swept local oscillator signal. In an embodiment, an input signal is combined with a swept local oscillator signal in an optical coupler and the sweep rate of the swept local oscillator signal is measured in a relative frequency measurement system. The combined optical signal is output from the optical coupler to a receiver and a heterodyne beat signal is generated. The heterodyne beat signal and measured local oscillator frequency sweep rate information are utilized by a signal processor to generate an output signal that is indicative of an optical parameter of the input signal and that accounts for non-uniformities in the sweep rate of the local oscillator signal. Because the actual sweep rate of the swept local oscillator signal is measured during analysis of the input signal, the optical frequency scale accuracy of heterodyne-based OSAs is improved.

A system for optical spectrum analysis includes a local oscillator source, an optical coupler, a heterodyne receiver, a relative frequency measurement system, and a signal processor. The local oscillator source generates a swept local oscillator signal that sweeps across a range of frequencies. The optical coupler has a first input, a second input, and an output. The first input being optically connected to receive an input signal, the second input being optically connected to the local oscillator source to receive the swept local oscillator signal, and the output being optically connected to output a combined optical signal that includes the input signal and the swept local oscillator signal. The heterodyne receiver has an input for receiving the combined optical signal from the optical coupler and an output for outputting a heterodyne beat signal that is representative of the combined optical signal. The relative frequency measurement system is optically connected to the local oscillator source and generates measured local oscillator frequency sweep rate information in response to the swept local oscillator signal. The signal processor receives the heterodyne beat signal from the optical receiver and the measured local oscillator frequency sweep rate information from the relative frequency measurement system and generates an output signal that is indicative of an optical parameter of the input signal.

A method for optical spectrum analysis that utilizes optical heterodyne detection involves providing an input signal, providing a swept local oscillator signal that sweeps across a range of frequencies, measuring the frequency sweep rate of the swept local oscillator signal to generate measured local oscillator frequency sweep rate information, combining the input signal with the swept local oscillator signal to create a combined optical signal, detecting the combined optical signal to generate a heterodyne beat signal, and generating an output signal, from the filtered heterodyne beat signal and the measured local oscillator frequency sweep rate information, that is indicative of an optical parameter of the input signal.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 5:
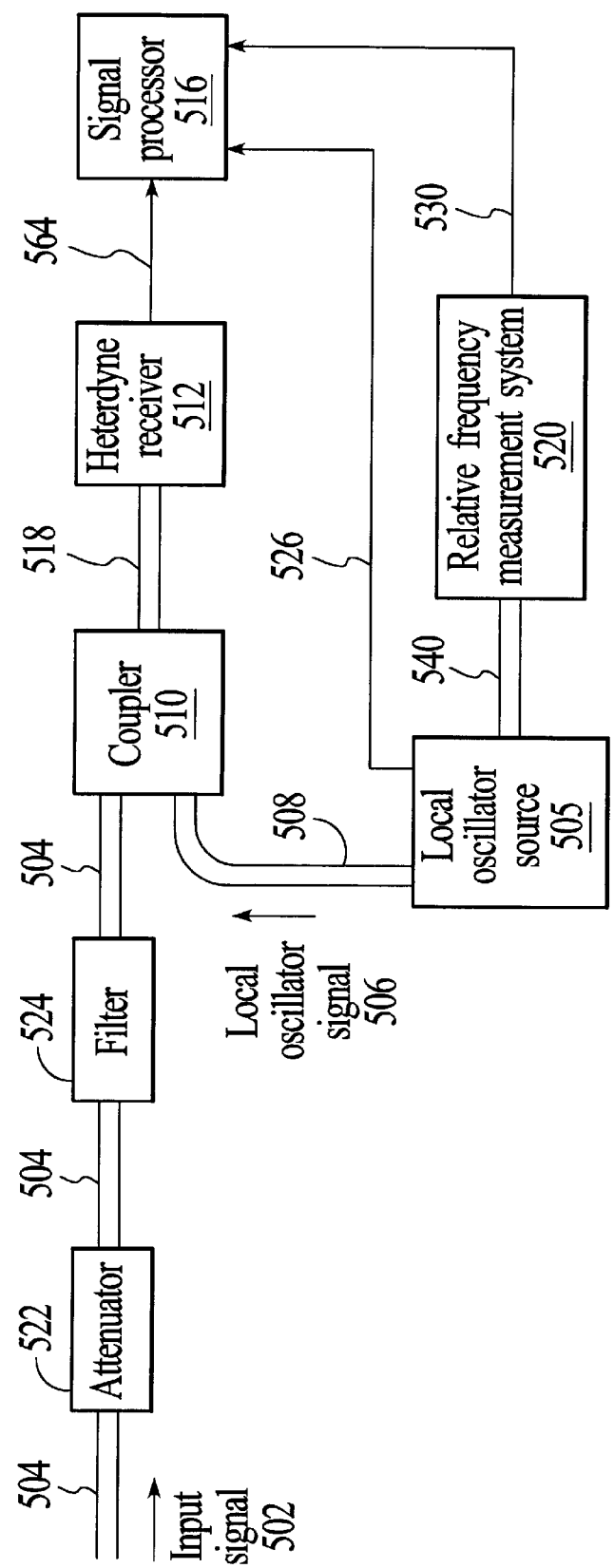
FIG. 5 depicts a heterodyne-based OSA that utilizes sweep rate correction to generate corrected spectrum information in accordance with an embodiment of the invention.

FIG. 5 depicts an embodiment of a heterodyne-based OSA that utilizes sweep rate correction to generate corrected spectrum information. The optical spectrum analyzer includes a signal fiber 504, a local oscillator source 505, a local oscillator fiber 508, an optical coupler 510, a heterodyne receiver 512, a signal processor 516, and a relative frequency measurement system 520. The heterodyne-based OSA may also include an optional attenuator 522 and an optional optical filter 524 that are optically connected to attenuate and filter the input signal. It should be noted that throughout the description, similar reference numerals are utilized to identify similar elements.

The signal fiber 504 carries an input signal that is to be detected by the heterodyne-based OSA. In an embodiment, the signal fiber is a single mode optical fiber as is known in the field. Throughout the description, the optical signals that are carried in optical fibers may alternatively be carried in other types of optical waveguides or in free space.

The input signal 502 includes optical signals that are generated from conventional devices as is known in the field of optical communications systems. For example, the input signal may be generated from a single laser or multiple lasers and may consist of a single wavelength or multiple wavelengths as is known in the field of wavelength division multiplexing. The input signal is typically modulated to carry digital information as is known in the field of optical communications.

In an embodiment, the input signal 502 has unknown optical characteristics that are measured by the optical spectrum analyzer. The input signal may alternatively be an optical signal that is input with known optical characteristics, in which case the optical spectrum analyzer can be utilized for optical network or component analysis. When the optical spectrum analyzer is utilized for optical network or component analysis, the characteristics of a network or a single component can be determined by inputting a known input signal into the network or the single component and then measuring the response to the known signal.

The local oscillator source 505 generates a swept local oscillator signal. In an embodiment, the local oscillator source is a highly coherent tunable laser, such as an external cavity laser, that is tunable over a wavelength range of one nanometer or greater. During optical spectrum analysis, the local oscillator source generates a highly coherent local oscillator signal that is swept across a range of frequencies, or wavelengths, in order to detect the input signal over the range of frequencies or wavelengths. In an embodiment, the sweep rate of the local oscillator signal at 1,550 nanometers is approximately 6.15 MHz/µs or 40 nm/s, however the sweep rate can be higher or lower and the sweep range is approximately 100 nm. Although a constant sweep rate is ideal, alternating sweep non-uniformities in the range of ±300 MHz have been observed in the sweep rate of a local oscillator signal that is emitted by, for example, an external cavity laser. In the embodiment of FIG. 5, the local oscillator source has an optical output that is connected to the coupler and another optical output that is connected to the relative frequency measurement system 520. The optical output that is connected to the coupler outputs a high power local oscillator signal and the optical output that is connected to the relative frequency measurement system outputs a low power source spontaneous emission (SSE) that has a characteristic of low optical noise. The local oscillator source also has an electrical output that outputs frequency information to the signal processor (as indicated by line 526). In an embodiment, the local oscillator source provides, to the signal processor, absolute frequency information that indicates the absolute frequency of the swept local oscillator signal. In an embodiment, the absolute frequency information is obtained from circuitry that controls the local oscillator source. Although the local oscillator source provides absolute frequency information, the absolute frequency information is not a measure of the actual frequency of the swept local oscillator signal and typically does not reflect non-uniformities in the frequency sweep rate of the local oscillator signal.

Figure 1:
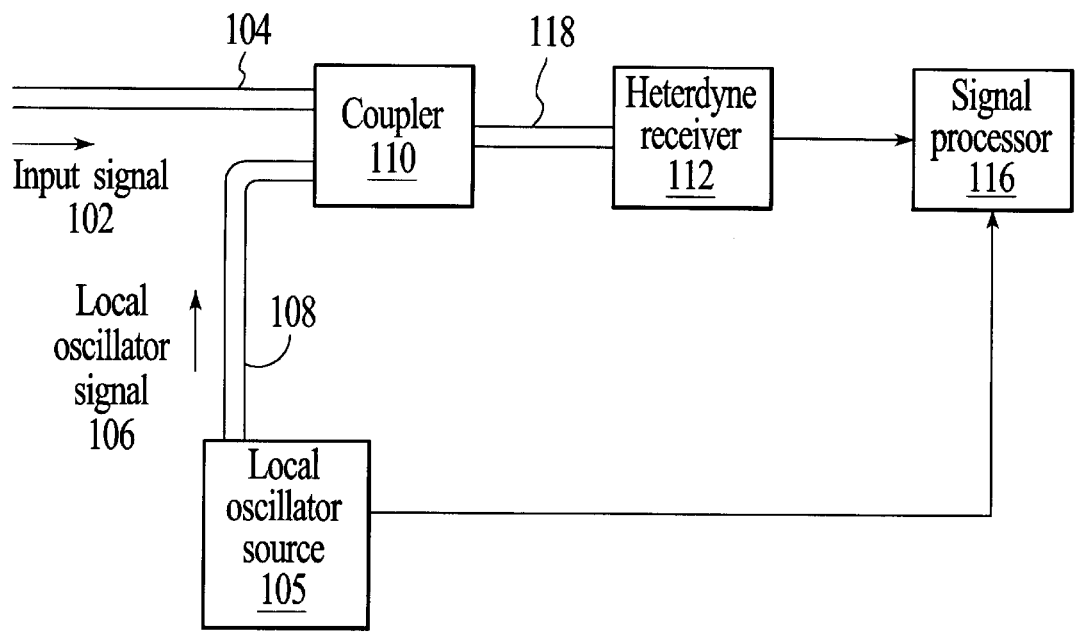
FIG. 1 is a depiction of heterodyne-based OSA that utilizes known signal processing to identify the heterodyne beat signal.
Figure 6:
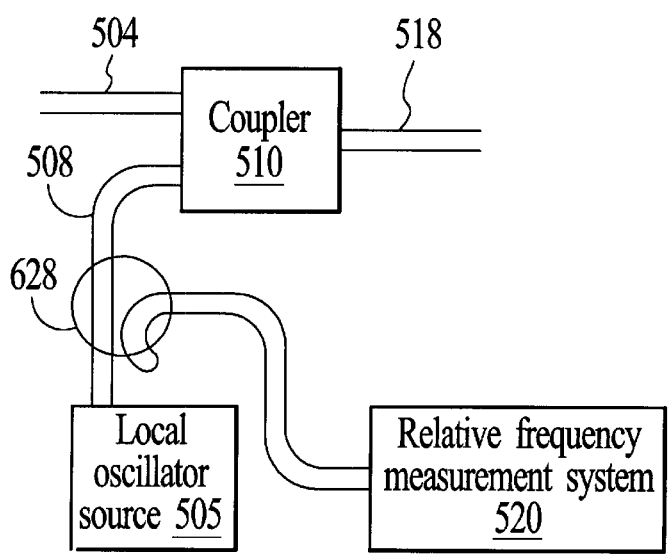
FIG. 6 depicts an optical tap located between the local oscillator source and the coupler that provides a sample of the swept local oscillator signal to the relative frequency measurement system in a heterodyne-based OSA.
Figure 2:
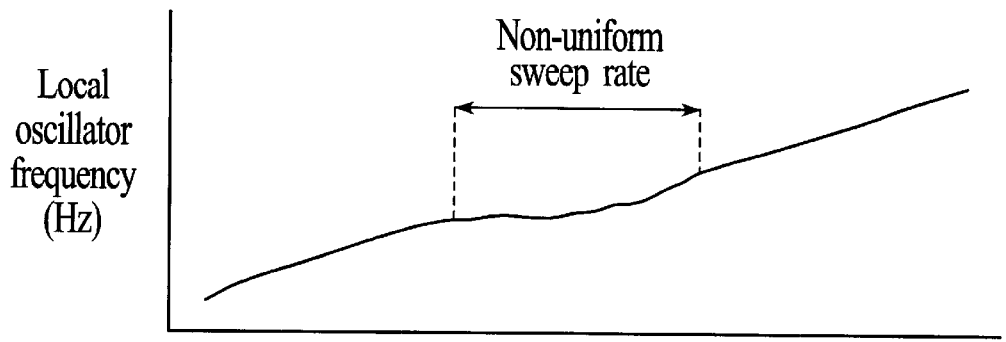
FIG. 2 depicts an example graph of a local oscillator signal that has a non-uniform sweep rate.
Figure 3:
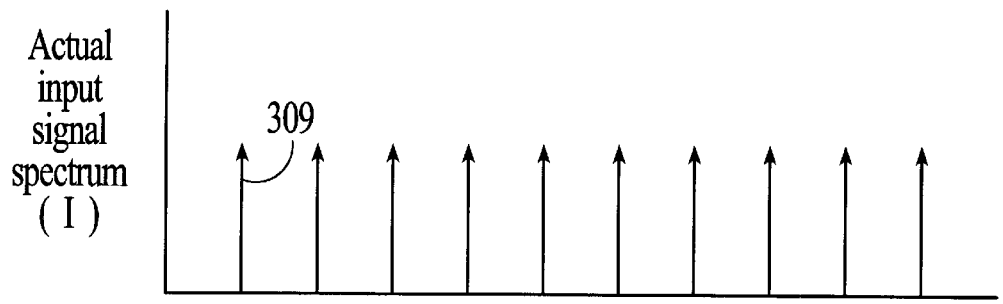
FIG. 3 depicts an example input signal spectrum that includes multiple DWDM channels.
Figure 4:
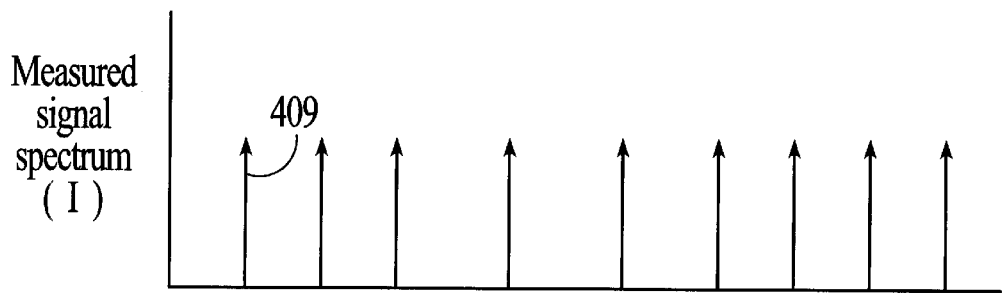
FIG. 4 depicts an example output from a heterodyne-based OSA that results from the non-uniformly swept local oscillator signal depicted in FIG. 2 in relation to the input signal spectrum of FIG. 3.

In an alternative embodiment of FIG. 5, the local oscillator source has one optical output that is optically connected to the coupler. A portion of the swept local oscillator signal is tapped off from the main signal and the tapped portion is optically connected to the relative frequency measurement system. FIG. 6 depicts a tap 528 located between the local oscillator source 505 and the coupler 510. The tap provides a sample of the swept local oscillator signal to the relative frequency measurement system 520.

Referring back to FIG. 5, the local oscillator fiber 508 is an optical fiber, such as a single mode optical fiber, that carries the local oscillator signal 506 to the optical coupler 510.

The optical coupler 510 combines the input signal 502 and the swept local oscillator signal 506 onto a common waveguide. As shown in FIG. 5, the optical coupler combines the input signal and the swept local oscillator signal and distributes the combined optical signal into an output fiber 518. Output fiber 518 guides the combined optical signal to the heterodyne receiver 512. Although only one output fiber is shown in FIG. 5, more than one output fiber can be utilized to transmit portions of the combined optical signal to the heterodyne receiver 512 for balanced detection.

The optical coupler 510 may be a 3 dB fiber-optic coupler, although other optical couplers may be utilized. In an embodiment, the optical coupler is substantially independent of the wavelength and polarization of the input signal 502 and the swept local oscillator signal 506. In an embodiment, the optical coupler is a single mode coupler.

The output fiber 518 is a single mode optical fiber that carries the combined optical signal from the optical coupler 510 to the heterodyne receiver 512. Multiple output fibers may be utilized when the heterodyne receiver is, for example, a balanced receiver.

The heterodyne receiver 512 is connected to receive the combined optical signal from the optical coupler 510. In an embodiment, the heterodyne receiver utilizes square law detection, which results in mixing of the input signal and the swept local oscillator signal. Mixing of the two optical signals produces a heterodyne beat signal at a frequency that is equal to the frequency difference between the input signal and the swept local oscillator signal. The heterodyne beat signal generated by the heterodyne receiver is provided to the signal processor 516 via an electrical connection 564. Although not shown, the heterodyne receiver may include photodetectors, signal amplifiers, filters, and analog-to-digital converters, as is known in the field. As an alternative to a photodetector based heterodyne receiver, the heterodyne receiver may utilize other detection devices, such as a non-linear mixing element. Other configurations of the heterodyne receiver may be implemented, such as, for example, a balanced receiver.

Figure 7:
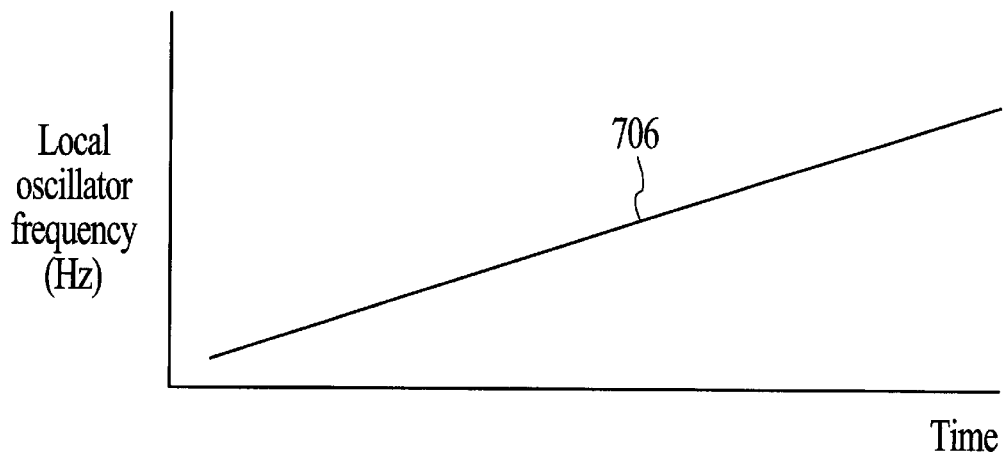
FIG. 7 is a graph of the frequency of a local oscillator signal that sweeps at a constant sweep rate.
Figure 8:
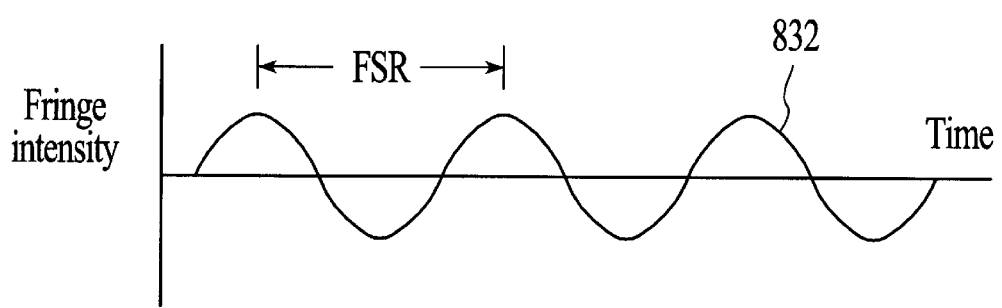
FIG. 8 is a graph of the fringe pattern that is generated from an interferometer in response to the optical signal depicted in FIG. 7.

The relative frequency measurement system 520 receives a portion of the swept local oscillator signal and outputs measured local oscillator frequency sweep rate information to the signal processor 516 (as indicated by line 530). In an embodiment, the relative frequency measurement system includes an interferometer that yields measured local oscillator sweep rate information in the form of a fringe pattern signal that is generated in response to a swept input optical frequency. Example embodiments of the relative frequency measurement system are described below with reference to FIGS. 18–24. In an embodiment, the interferometer produces a sinusoidal fringe pattern signal (or multiple fringe patterns if multiple photodetectors are used) in which the change in optical frequency of the input local oscillator signal can be determined by counting the peaks (or other features) of the sinusoidal fringe pattern signal. The peaks of the sinusoidal fringe pattern signal represent the free spectral range (FSR) of the interferometer and the free spectral range is inversely proportional to the delay ($\tau$) of the interferometer. The time that elapses between each peak of the sinusoidal fringe pattern signal is used to calculate the sweep rate of the optical frequency. FIG. 7 is a graph of the frequency of an optical signal 708 that sweeps at a constant rate (i.e., $d\nu/dt$=constant) and FIG. 8 is a graph of the fringe pattern signal 832 that is detected from an interferometer in response to the optical signal 706 depicted in FIG. 7. As shown in FIG. 8, the period of the sinusoidal fringe pattern signal, which is equivalent to the FSR, is constant with respect to time, and therefore represents a constant sweep rate.

Figure 9:
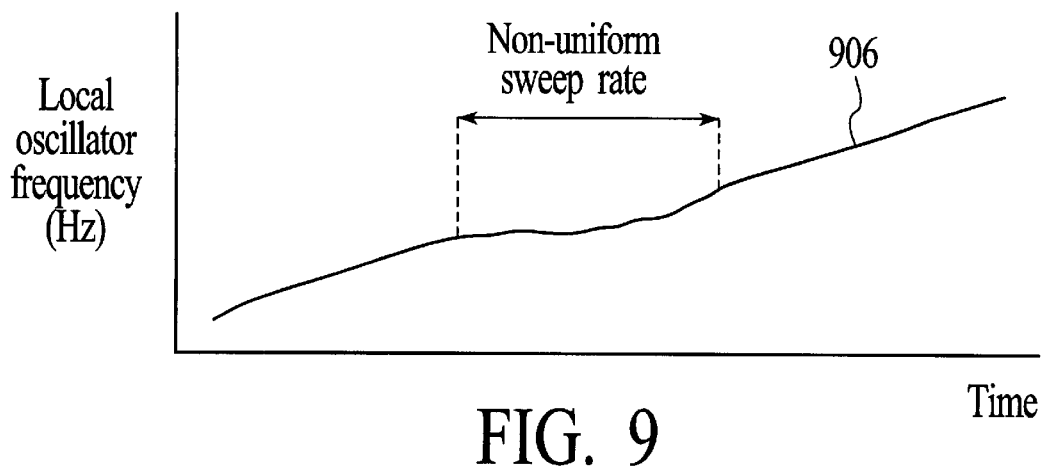
FIG. 9 is a graph of the frequency of an optical signal that sweeps at a non-uniform rate for some portion of time.
Figure 10:
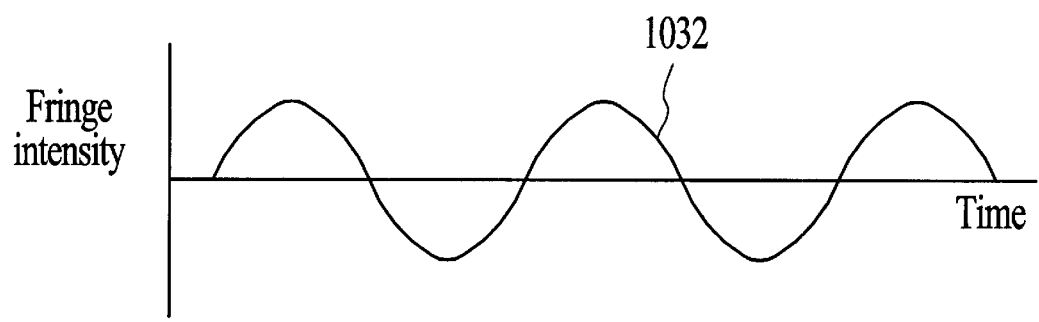
FIG. 10 is a graph of the fringe pattern that is generated from an interferometer in response to the optical signal depicted in FIG. 9.

In contrast to a constant sweep rate (also referred to as a uniform sweep rate), FIG. 9 is a graph of the frequency of an optical signal 906 that sweeps at a non-uniform rate for some portion of time and FIG. 10 is a graph of the fringe pattern signal 1032 that is generated from an interferometer in response to the optical signal 906 depicted in FIG. 9. As shown in FIG. 10, the period of the sinusoidal fringe pattern signal is not constant with respect to time. The rate of change of the frequency can be determined by counting the peaks of the fringe pattern signal and dividing by the elapsed time between each peak. The different time intervals between the peaks of the fringe pattern signal represent the non-uniformity in the sweep rate of the input signal's optical frequency.

Referring back to FIG. 5, the signal processor 516 includes a multifunction processor that receives electrical signals from the heterodyne receiver 512, from the local oscillator source 505, and from the relative frequency measurement system 520. The processor isolates the heterodyne beat signal and utilizes the frequency information from the local oscillator source and from the relative frequency measurement system to generate an output signal that is indicative of an optical parameter, such as optical frequency, wavelength, or amplitude, of the input signal 502. The signal processor may include analog signal processing circuitry, digital signal processing circuitry, or software or any combination thereof, as is known in the field of electrical signal processing. Embodiments of the signal processor are described below with reference to FIGS. 11 and 16.

Figure 11:
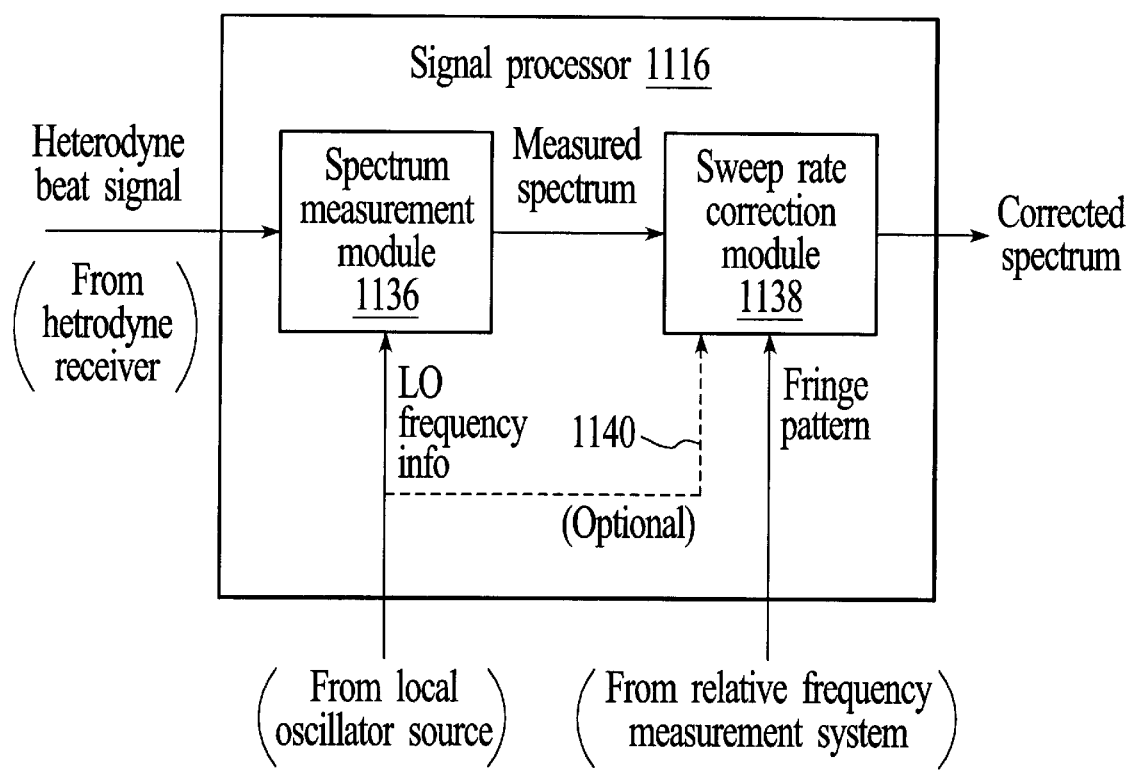
FIG. 11 depicts an expanded view of an embodiment of the signal processor that is depicted in FIG. 5.

FIG. 11 depicts an embodiment of the signal processor of FIG. 5. The signal processor 1116 in the embodiment of FIG. 11 includes a spectrum measurement module 1136 and a sweep rate correction module 1138. The spectrum measurement module receives the heterodyne beat signal from the heterodyne receiver and absolute frequency information from the local oscillator source and outputs measured spectrum information. The sweep rate correction module receives the measured spectrum information from the spectrum measurement module and the measured local oscillator frequency sweep rate information (i.e., the fringe pattern signal) from the relative frequency measurement system and outputs corrected spectrum information. In an embodiment, the sweep rate correction module utilizes the fringe pattern signal to generate actual sweep rate information and then uses the actual sweep rate information to correct the frequency scale of the measured spectrum information. The corrected spectrum information is corrected to account for non-uniformities in the frequency sweep rate of the local oscillator signal. The spectrum measurement and sweep rate correction modules may be sub-elements of a multifunction processor and may include hardware or software, or any combination thereof.

Figure 12:
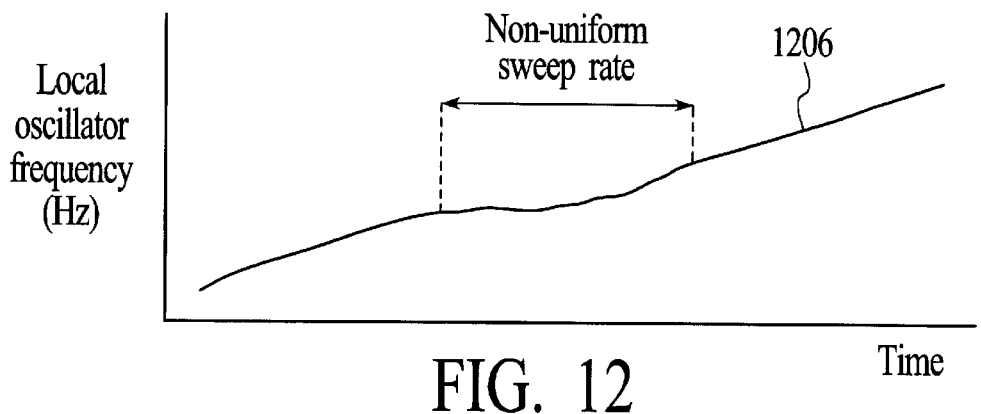
FIG. 12 depicts an example graph of a local oscillator signal that has a non-uniform sweep rate.
Figure 13:
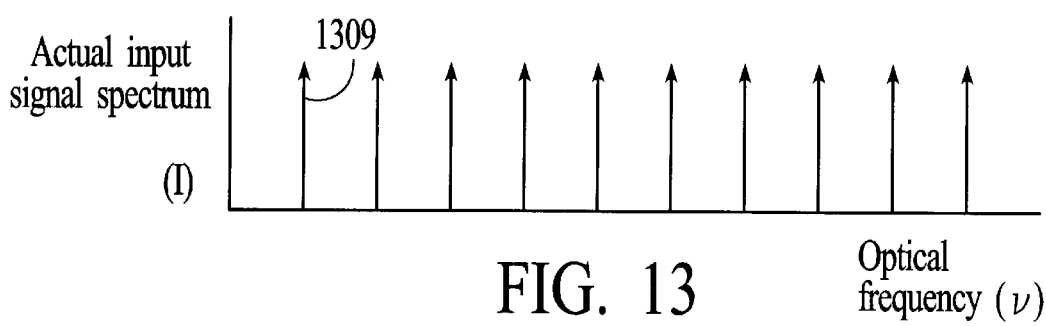
FIG. 13 depicts an example input signal spectrum that includes multiple DWDM channels.

Operation of the heterodyne-based OSA with sweep rate correction is described herein with reference to FIGS. 5 and 11–15. Turning to FIG. 5, the local oscillator source 505 generates a swept local oscillator signal 506 that is transmitted through the local oscillator fiber 508 to the optical coupler 510. A sample of the swept local oscillator signal is also transmitted through the sample fiber 540 to the relative frequency measurement system 520 and absolute local oscillator frequency information is provided to the signal processor via the electrical connection 526. An example graph of the swept local oscillator signal frequency versus time is depicted in FIG. 12. The non-uniform sweep rate is represented by the non-linear section of the frequency versus time graph. Simultaneously with the swept local oscillator signal being swept, an input signal 502 propagates through the input fiber 504 of the heterodyne-based OSA towards the optical coupler 510. An example signal spectrum of the input signal is depicted in FIG. 13. In the example signal spectrum, the input signal is a wavelength division multiplexed signal that includes multiple evenly spaced channels 1309. For example, each of the channels may be spaced apart by 100 GHz. The input signal and the swept local oscillator signal are combined by the optical coupler into a combined optical signal. The combined optical signal is output onto output fiber 518 and transmitted to the heterodyne receiver 512. The combined optical signal is detected and mixed by the heterodyne receiver. A heterodyne beat signal is generated in response to the combined optical signal and the heterodyne beat signal is output to the signal processor via the electrical connection 564. Meanwhile, the frequency sweep rate of the swept local oscillator signal sample that is received by the relative frequency measurement system is measured and measured local oscillator sweep rate information is output to the signal processor.

Figure 14:
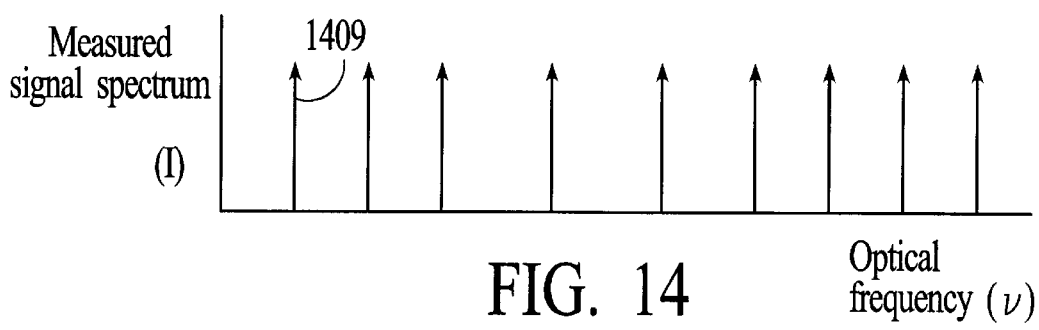
FIG. 14 depicts an example output from a heterodyne-based OSA that results from the non-uniformly swept local oscillator signal depicted in FIG. 12 in relation to the input signal spectrum of FIG. 13.

Referring to FIG. 11, the spectrum measurement module 1136 receives the heterodyne beat signal from the heterodyne receiver and the absolute local oscillator frequency information from the local oscillator source. The spectrum measurement module utilizes the heterodyne beat signal and the absolute local oscillator frequency information to generate measured spectrum information. As described above, non-uniformities in the actual frequency sweep rate of the local oscillator signal will cause inaccuracies in the measured spectrum information. FIG. 14 depicts the measured spectrum that is generated in response to the input signal spectrum that is depicted in FIG. 13 and the non-uniformly swept local oscillator signal that is depicted in FIG. 12. The measured spectrum of FIG. 14 does not accurately reflect the input signal spectrum of FIG. 14 (as indicated by the channels that have a different channel spacing than the channels depicted in FIG. 13) because of the non-uniformities in the sweep rate of the local oscillator signal. Specifically, over the frequency ranges where the sweep rate is non-uniform, the individual channels in the spectrum are not measured to have equal channel spacing.

Figure 15:
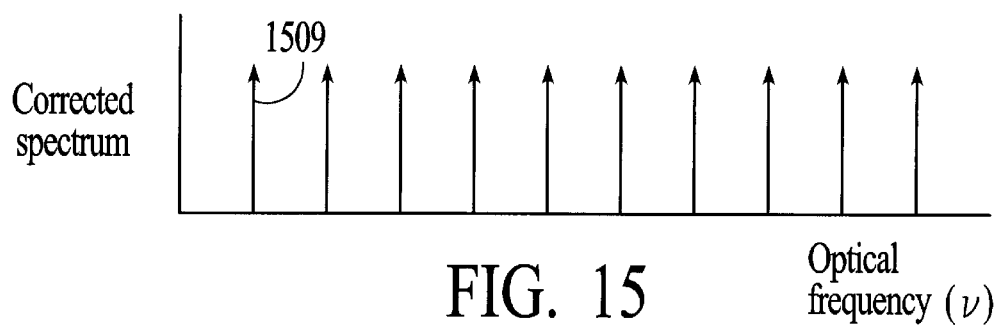
FIG. 15 depicts corrected spectrum information that is generated by the sweep rate correction module of FIG. 11.

Referring again to FIG. 11, the sweep rate correction module 1138 receives the measured spectrum information from the spectrum measurement module 1136 and the measured local oscillator frequency sweep rate information (i.e., a fringe pattern signal) from the relative frequency measurement system. The sweep rate correction module utilizes the measured spectrum information and the measured local oscillator frequency sweep rate information to generate corrected spectrum information. The corrected spectrum information takes into account the non-uniformities in the sweep rate of the local oscillator signal. That is, the corrected spectrum information corrects the horizontal scale of the amplitude versus optical frequency graph that is typically displayed by an OSA. FIG. 15 depicts the corrected spectrum information that is generated by the sweep rate correction module in response to the measured spectrum information and the measured local oscillator frequency sweep rate information. The corrected spectrum information depicted in FIG. 15 accurately reflects the input signal spectrum that is depicted in FIG. 13.

Referring back to FIG. 5 again, in an embodiment, the optional attenuator 522 is integrated into the input fiber 504 in order to attenuate the input signal 502. Attenuating the input signal reduces the intensity noise that is generated by the input signal during detection by the heterodyne receiver 512. The particular type of attenuator is not critical and therefore various types of attenuators, as are known in the field of optical attenuation, may be utilized. Preferably, the attenuator is adjustable such that the level of attenuation can be varied as needed to control the intensity of the input signal that is passed to the optical coupler 510. In an embodiment, the attenuator can be adjusted to completely block transmission of the input signal. Completely blocking transmission of the input signal can be useful during system calibration.

The optional optical filter 524 is a tunable bandpass filter that is tuned to track the swept local oscillator signal 506. That is, the optical filter is tuned so that the optical filter has the highest optical transmission over a frequency band that corresponds to the frequency of the swept local oscillator signal. The optical filter may be tuned to track the swept local oscillator signal utilizing known frequency tracking techniques. In an embodiment, the center of the filter passband is tuned to the frequency of the swept local oscillator signal. In another embodiment, the center of the filter passband is tuned slightly off the local oscillator frequency in order to generate the heterodyne signal at a higher frequency, for example, when image rejection is important. Tunable optical filters are well known in the field of optical communications and can be implemented utilizing components such as diffraction gratings, dielectric interference filters, periodic Bragg devices, such as tunable fiber Bragg gratings, Fabry-Perot interferometers, and other known interferometers.

Figure 16:
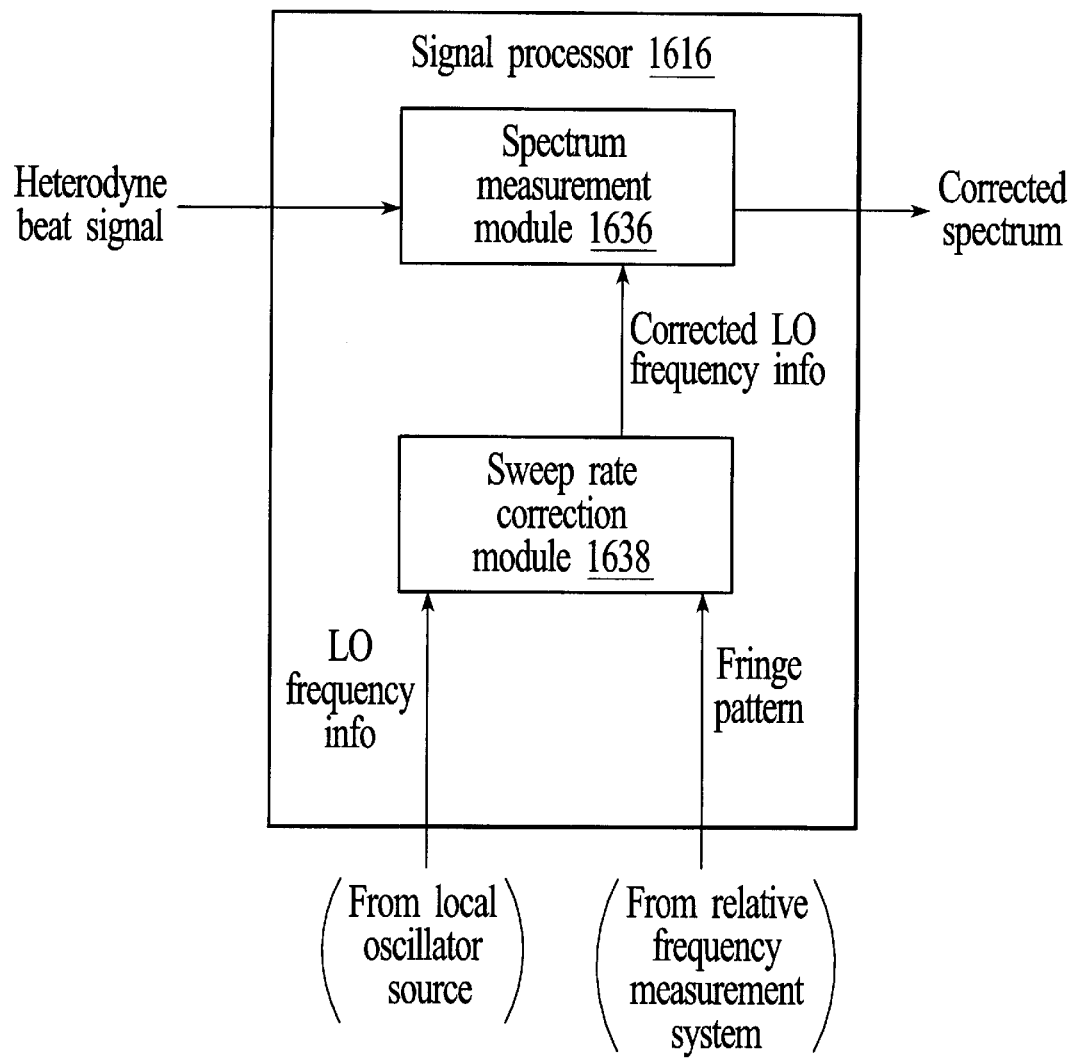
FIG. 16 depicts an expanded view of another embodiment of the signal processor that is depicted in FIG. 5.

FIG. 16 depicts another embodiment of the signal processor FIG. 5. The signal processor 1616 of FIG. 16 is designed to correct the local oscillator frequency information prior to generating measured spectrum information. The signal processor includes a spectrum measurement module 1036 and a sweep rate correction module 1638. The sweep rate correction module receives absolute frequency information from the local oscillator source and measured local oscillator frequency sweep rate information from the relative frequency measurement system. The sweep rate correction module utilizes the measured local oscillator frequency sweep rate information to correct the absolute local oscillator frequency information before the absolute local oscillator frequency information is provided to the spectrum measurement module. In an embodiment, the corrected absolute local oscillator frequency information is provided to the spectrum measurement module in real-time. The spectrum measurement module utilizes the heterodyne beat signal and the corrected absolute local oscillator frequency information to generate corrected spectrum information in real-time that accurately accounts for non-uniformities in the frequency sweep rate of the local oscillator signal. The spectrum measurement and sweep rate correction modules may be sub-elements of a multifunction processor and may include hardware or software, or any combination thereof.

Figure 17:
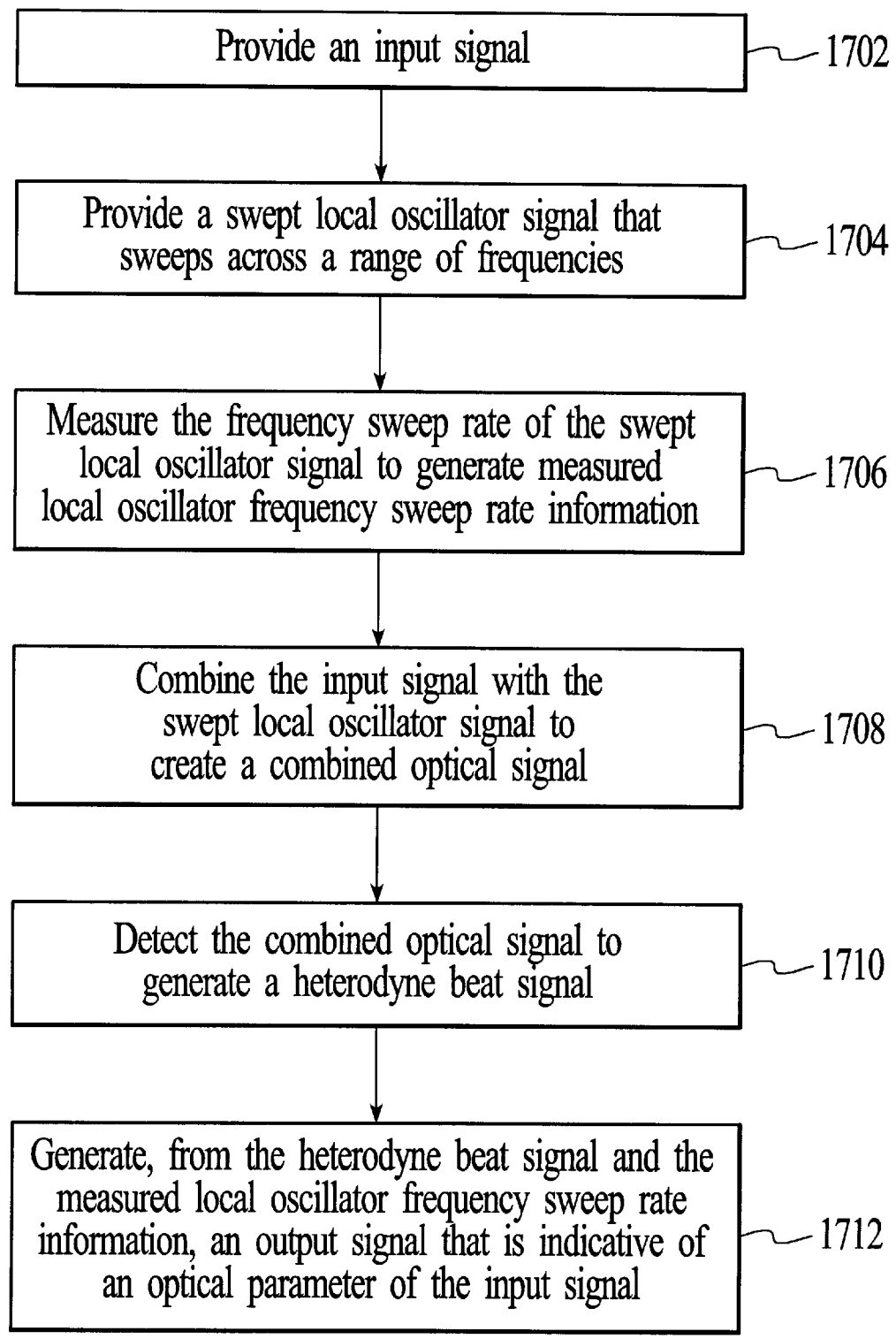
FIG. 17 is a process flow diagram of a method for optical spectrum analysis that utilizes optical heterodyne detection in accordance with an embodiment of the invention.

A process flow diagram of a method for optical spectrum analysis that utilizes optical heterodyne detection is depicted in FIG. 17. At step 1702, an input signal is provided. At step 1704, a swept local oscillator signal that sweeps across a range of frequencies is provided. At step 1706, the frequency sweep rate of the swept local oscillator signal is measured to generate measured local oscillator frequency sweep rate information. At step 1708, the input signal is combined with the swept local oscillator signal to create a combined optical signal. At step 1710, the combined optical signal is detected to generate a heterodyne beat signal. At step 1712, an output signal, which is indicative of an optical parameter of the input signal, is generated from the heterodyne beat signal and the measured local oscillator frequency sweep rate information.

Example embodiments of the relative frequency measurement system depicted in FIGS. 5 and 6 are described below with reference to FIGS. 18–24. The relative frequency measurement systems, also commonly referred to as interferometers or wave counters, all impart a delay on some portion of the swept local oscillator signal so that the relative change of frequency of the swept local oscillator signal can be determined from the detected interference fringes.

Figure 18:
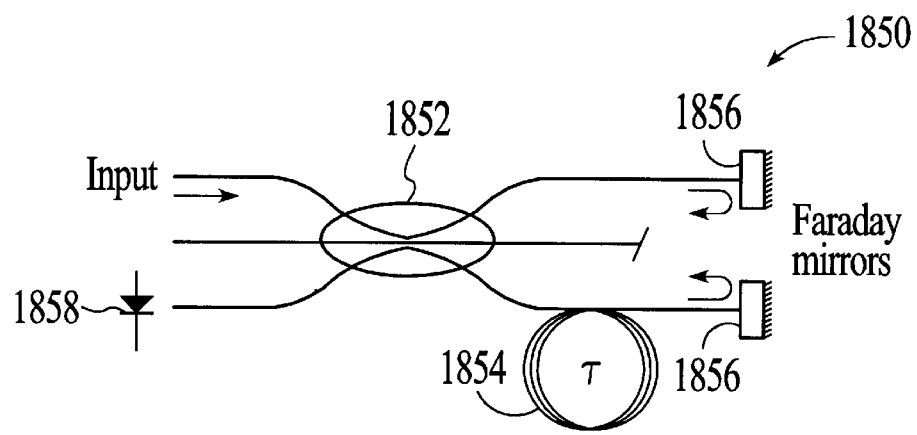
FIG. 18 depicts an embodiment of the relative frequency measurement system shown in FIG. 5.

FIG. 18 depicts a Michelson interferometer 1850 that includes a coupler 1852, a delay 1854 that delays an optical signal by a delay time, τ, two Faraday mirrors 1856, and a photodetector 1858. The interferometer couples the swept local oscillator signal onto two fibers and then reflects the two optical signals back to the photodetector. The two signals are delayed relative to one another by the delay time, τ and therefore differ in frequency. The delay between the two signals results in an optical frequency dependent fringe pattern signal at the output of the photodetector. The fringe pattern signal is used as described above, to determine the sweep rate of the local oscillator signal.

Figure 19:
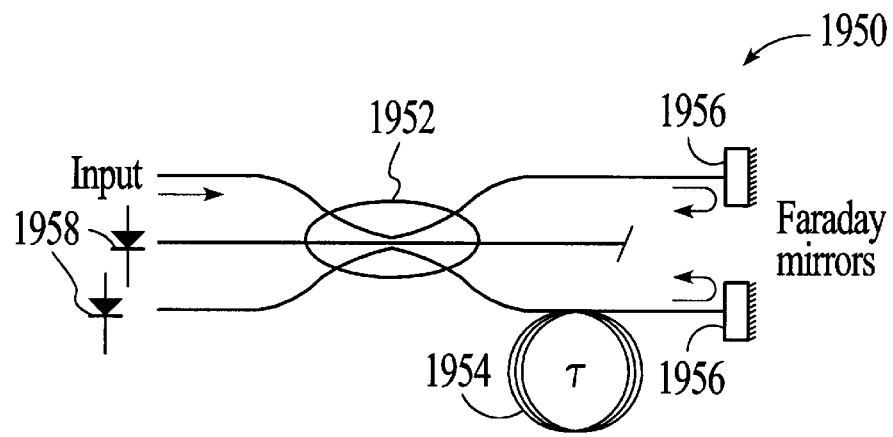
FIG. 19 depicts another embodiment of the relative frequency measurement system shown in FIG. 5.

FIG. 19 depicts an interferometer 1950 that is similar to the interferometer of FIG. 18 except that it includes two photodetectors 1958 that are coupled to detect the two reflected optical signals. Referring to FIG. 19, a third fiber integrated into coupler 1952 allows reflected signal to be detected by the second photodetector. Adding a second photodetector can reduce counting errors that are caused by changes in the frequency sweep direction.

Figure 20:
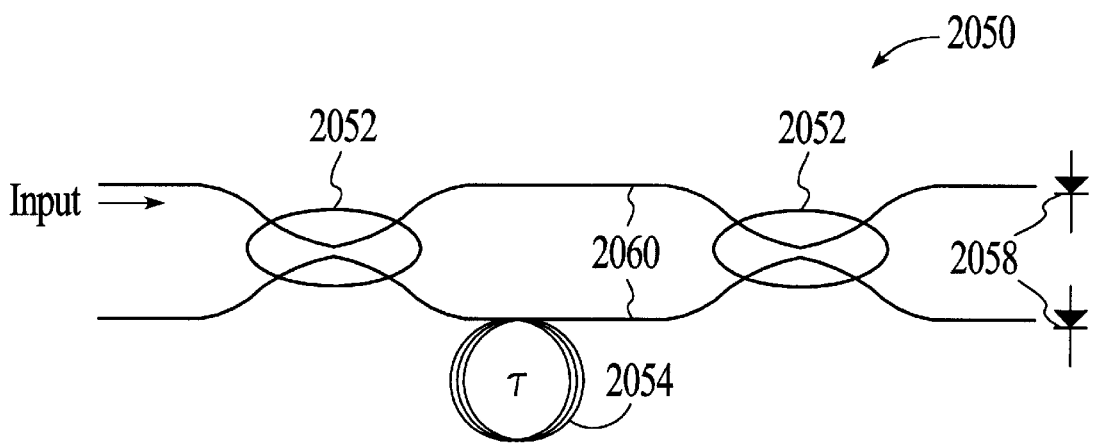
FIG. 20 depicts another embodiment of the relative frequency measurement system shown in FIG. 5.

FIG. 20 depicts a Mach-Zehnder interferometer 2050 that includes two couplers 2052, two parallel optical fibers 2060 and a delay 2054 on one of the parallel optical fibers. The interferometer couples the swept local oscillator signal onto the two parallel fibers and one of the two signals is delayed by τ. The two signals are recombined at the second coupler and then output to the two photodetectors. The two signals are separated by the delay, τ, and the frequency dependent optical phase between the two signals causes frequency-dependent fringe pattern signals to be generated at the outputs of the photodetectors 2058.

Figure 21:
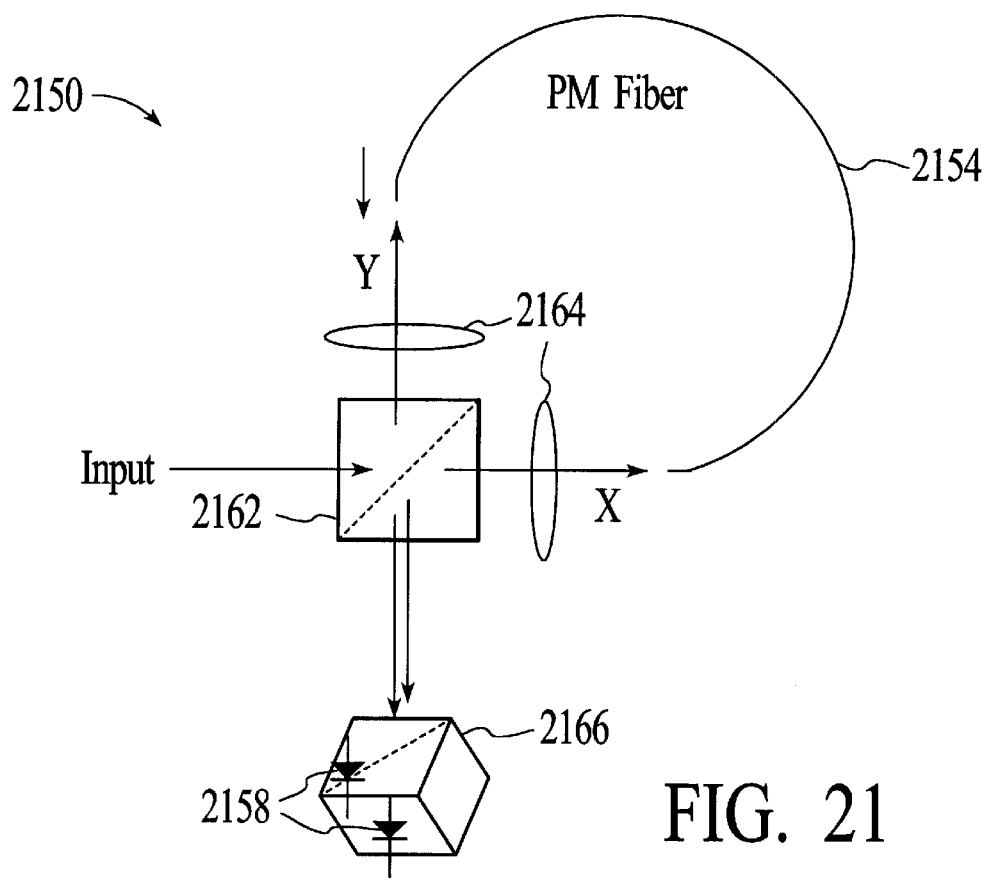
FIG. 21 depicts another embodiment of the relative frequency measurement system shown in FIG. 5.

FIG. 21 depicts an interferometer 2150 that includes a first polarizing beam splitter 2162, two lenses 2164, a delay fiber 2154, a second beam splitter 2166, and two photodetectors 2158 that are coupled to the second beam splitter. The first polarizing beam splitter splits the incoming swept local oscillator signal into two orthogonally polarized optical signals that propagate through the delay fiber in opposite directions. In an embodiment, the delay fiber is polarization maintaining (PM) fiber. Within the PM fiber, a delay is imparted on one of the orthogonally polarized optical signals relative to the other orthogonally polarized optical signal. The two orthogonally polarized optical signals are recombined at the polarizing beam splitter and are directed to the second beam splitter. The second beam splitter splits the recombined optical signal into two signals for detection by the two photodetectors. Because a delay is imparted on one of the polarized signals, the difference in phase between the two signals causes fringe pattern signals to be generated at the outputs of the photodetectors. The fringe pattern signals are used, as described above, to determine the sweep rate of the local oscillator signal.

Figure 22:
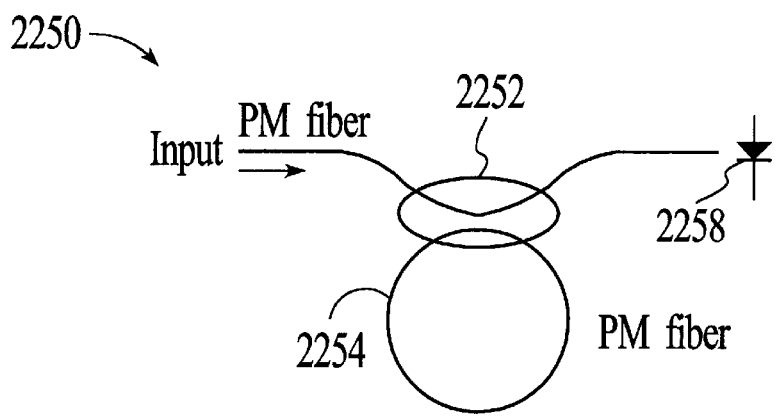
FIG. 22 depicts another embodiment of the relative frequency measurement system shown in FIG. 5.

FIG. 22 depicts an interferometer 2250 that includes a coupler 2252, a delay loop 2254, and a photodetector 2258. In the embodiment of FIG. 22, all of the optical fiber is PM fiber. The interferometer couples a portion of the swept local oscillator signal onto the delay loop where the optical signal on the delay loop where a delay to time, τ, is imparted on the signal. The delayed signal is then recombined at the optical coupler and propagates to the photodetector. Because of the delay imparted on the signal that travels in the delay loop, a fringe pattern signal is generated at the output of the photodetector. The fringe pattern signal is used, as described above, to determine the sweep rate of the local oscillator signal.

Figure 23:
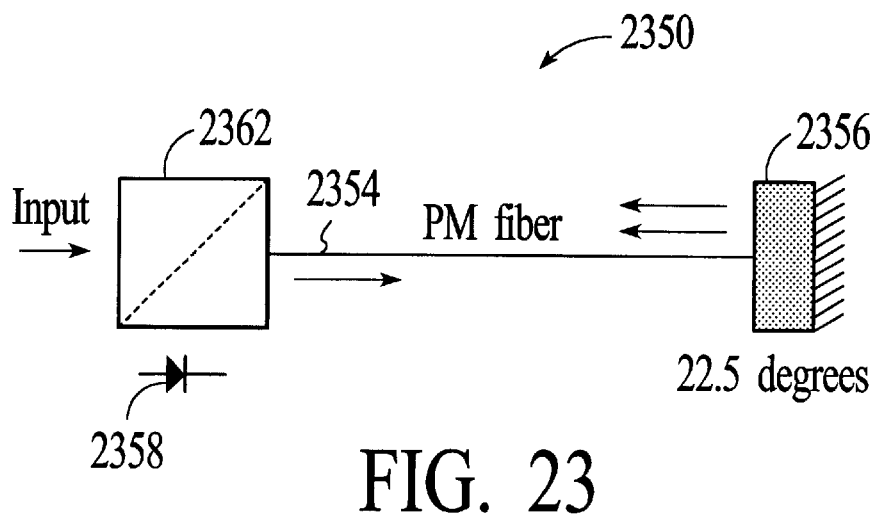
FIG. 23 depicts another embodiment of the relative frequency measurement system shown in FIG. 5.

FIG. 23 depicts an interferometer 2350 that includes a beam splitter 2362 and a polarization rotating mirror 2356 that are connected by a PM fiber 2354, and a photodetector 2358. The beam splitter splits the swept local oscillator signal into two portions, with a first portion being detected by the photodetector without delay. The second portion propagates along the PM fiber until it is reflected by the polarization rotating mirror thereby sending light down both the slow axis and the fast axis of the PM fiber. The reflected optical signal enters the beam splitter and a portion of the optical signal is detected by the photodetector. The difference in phase between the detected signals causes a fringe pattern signal that is used to determine the sweep rate of the local oscillator signal.

Figure 24:
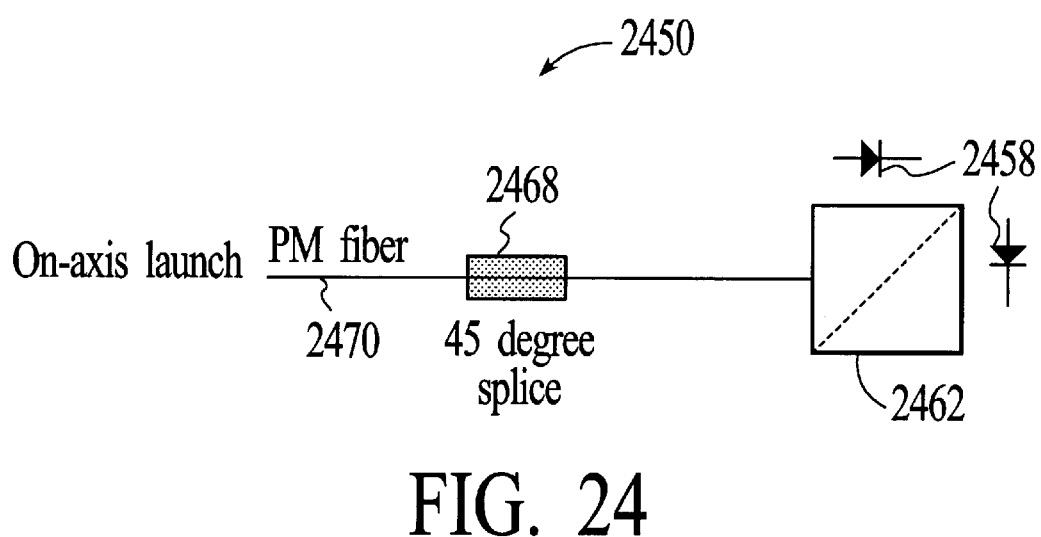
FIG. 24 depicts another embodiment of the relative frequency measurement system shown in FIG. 5.

FIG. 24 depicts an interferometer 2450 that includes a first PM fiber 2470, a 45 degree splice 2468, a second PM fiber 2472, a beam splitter 2462, and two photodetectors 2458 at the output of the beam splitter. The swept local oscillator signal is initially launched into the first PM fiber on-axis. The 45 degree splice splits the swept local oscillator signal into two orthogonally polarized signals, with one signal fifty percent on the x-axis and the other signal being fifty percent on the y-axis. Within the second PM fiber, a delay is imparted on one of the orthogonally polarized optical signals relative to the other orthogonally polarized optical signals. The two orthogonally polarized optical signals are combined by the polarizing beam splitter and detected by the two photodetectors. Because a delay is imparted on one of the polarized signals, the difference in phase between the two signals causes fringe pattern signals to be generated at the outputs of the photodetectors.

One problem with the relative frequency measurement systems described with reference to FIGS. 18–24 is chromatic dispersion. Chromatic dispersion causes the delay τ to vary with the frequency of the swept local oscillator signal and can cause the measured local oscillator frequency sweep rate information to be inaccurate. One technique to account for chromatic dispersion involves designing dispersion correction into the relative frequency measurement system and another technique involves incorporating a dispersion correction algorithm into the signal processor.

In an embodiment, designing dispersion correction into the relative frequency measurement system involves using two optical fibers that are oriented so that they have frequency-dependent delays that cancel each other out. That is, the two optical fibers have equal and opposite frequency-dependent delays. For example, an optical fiber having a delay characteristic that increases with frequency can be spliced to an optical fiber having a delay characteristic that decreases with frequency. In an embodiment, the length of the fibers is set such that the chromatic dispersion effects of the second fiber cancel the chromatic dispersion effects of the first fiber. In another embodiment, optical fibers with reduced chromatic dispersion are utilized to reduce the effects of chromatic dispersion.

In an embodiment, incorporating a dispersion correction algorithm into the signal processor involves utilizing knowledge of the frequency dependence of the optical delay to reduce the effects of chromatic dispersion. In an embodiment, the algorithm utilizes absolute frequency information from the local oscillator source to calculate the effects of dispersion and then corrects for the calculated effects. Referring back to the signal processor 1116 of FIG. 11, the sweep rate correction module utilizes the local oscillator frequency information from the local oscillator source (as indicated by dashed line 1140) to reduce chromatic dispersion-induced error.

Although the optical components of the optical heterodyne detection system are described as being connected by optical fibers, the individual devices may be integrated onto a monolithic device, such as a planar waveguide circuit. Alternatively, the optical elements may be connected by free space.

What is claimed is:

1. A system for optical spectrum analysis comprising:
   a local oscillator source for generating a swept local oscillator signal that sweeps across a range of frequencies;
   an optical coupler having a first input and a second input, said first input being optically connected to receive an input signal, said second input being optically connected to said local oscillator source to receive said swept local oscillator signal, said optical coupler having an output for outputting a combined optical signal that includes said input signal and said swept local oscillator signal;
   a heterodyne receiver having an input for receiving said combined optical signal from said optical coupler and an output for outputting a heterodyne beat signal that is representative of said combined optical signal;
   a relative frequency measurement system optically connected to said local oscillator source for generating measured local oscillator frequency sweep rate information in response to said swept local oscillator signal; and
   a signal processor for utilizing said heterodyne beat signal from said optical receiver and said measured local oscillator frequency sweep rate information from said relative frequency measurement system to generate an output signal that is indicative of an optical parameter of said input signal.

2. The system of claim 1 wherein said signal processor includes:
   a spectrum measurement module for generating measured spectrum information; and
   a sweep rate correction module for correcting said measured spectrum information in response to said measured local oscillator frequency sweep rate information, wherein said measured spectrum information is corrected to account for non-uniformities in the frequency sweep rate of said swept local oscillator signal.

3. The system of claim 1 wherein said signal processor includes:
   a sweep rate correction module for generating corrected local oscillator frequency information in response to said measured local oscillator frequency sweep rate information, wherein said corrected local oscillator frequency information accounts for non-uniformities in the frequency sweep rate of said swept local oscillator signal; and
   a spectrum measurement module for generating said output signal in response to said heterodyne beat signal and said corrected local oscillator frequency information.

4. The system of claim 1 wherein said relative frequency measurement system includes means for delaying a portion of said swept local oscillator signal so that the relative change of frequency of said swept local oscillator signal can be determined.

5. The system of claim 4 wherein said relative frequency measurement system includes a first polarization maintaining (PM) fiber and a second PM fiber connected by a 45 degree splice, a beam splitter optically connected to one end of said second PM fiber, and at least one photodetector optically connected to said beam splitter.

6. The system of claim 1 wherein said relative frequency measurement system includes an interferometer system that produces a sinusoidal current in response to said swept local oscillator signal.

7. The system of claim 6 wherein said interferometer includes optical waveguides with opposite chromatic dispersion properties to reduce chromatic dispersion of said swept local oscillator signal.

8. The system of claim 6 wherein said interferometer includes an optical waveguide with reduced chromatic dispersion properties to reduce chromatic dispersion of said swept local oscillator signal.

9. The system of claim 1 wherein said signal processor includes a dispersion correction module that uses a characteristic of the wavelength dependence of chromatic dispersion as a function of delay to reduce chromatic dispersion-induced error that exists in said measured local oscillator frequency sweep rate information.

10. A method for optical spectrum analysis that utilizes optical heterodyne detection, the method comprising:
   providing an input signal;
   providing a swept local oscillator signal that sweeps across a range of frequencies;
   measuring the frequency sweep rate of said swept local oscillator signal to generate measured local oscillator frequency sweep rate information;
   combining said input signal with said swept local oscillator signal to create a combined optical signal;
   detecting said combined optical signal to generate a heterodyne beat signal; and generating, from said heterodyne beat signal and said measured local oscillator frequency sweep rate information, an output signal that is indicative of an optical parameter of said input signal.

11. The method of claim 10 wherein said step of generating said output signal includes a step of correcting non-uniformities in the frequency sweep rate of said swept local oscillator signal in response to said measured local oscillator frequency sweep rate information.

12. The method of claim 10 wherein said step of measuring the frequency sweep rate of said swept local oscillator signal includes a step of detecting a time-varying fringe pattern signal in response to said swept local oscillator signal.

13. The method of claim 12 wherein said step of detecting a time-varying fringe pattern signal includes a step of imparting a delay on a portion of said swept local oscillator signal.

14. The method of claim 10 wherein said step of measuring the sweep rate of said swept local oscillator signal to generate measured local oscillator frequency sweep rate information includes a step of correcting for the effects of chromatic dispersion on said measured local oscillator frequency sweep rate information.

15. The method of claim 14 wherein said step of correcting for the effects of chromatic dispersion includes a step of utilizing optical waveguides with opposite chromatic dispersion properties to reduce chromatic dispersion of said swept local oscillator signal.

16. The method of claim 14 wherein said step of correcting for the effects of chromatic dispersion includes a step of utilizing an optical waveguide with reduced chromatic dispersion properties to reduce chromatic dispersion of said swept local oscillator signal.

17. The method of claim 14 wherein said step of correcting for the effects of chromatic dispersion includes a step of utilizing a characteristic of the wavelength dependence of chromatic dispersion to reduce chromatic dispersion-induced error in said measured local oscillator frequency sweep rate information.

18. A system for optical spectrum analysis comprising:
a local oscillator source for generating a swept local oscillator signal that sweeps across a range of frequencies, said local oscillator source outputting absolute frequency information that indicates the frequency of the swept local oscillator signal;
an optical coupler having a first input and a second input, said first input being optically connected to receive an input signal, said second input being optically connected to said local oscillator source to receive said swept local oscillator signal, said optical coupler having an output for outputting a combined optical signal that includes said input signal and said swept local oscillator signal;
a heterodyne receiver having an input for receiving said combined optical signal from said optical coupler and an output for outputting a heterodyne beat signal that is representative of said combined optical signal;
a relative frequency measurement system optically connected to said local oscillator source for generating measured local oscillator frequency sweep rate information in response to said swept local oscillator signal; and
a signal processor for utilizing said absolute frequency information from said local oscillator source, said heterodyne beat signal from said optical receiver, and said measured local oscillator frequency sweep rate information from said relative frequency measurement system to generate an output signal that is indicative of an optical parameter of said input signal.

19. The system of claim 18 wherein said signal processor includes:
a spectrum measurement module for generating measured spectrum information from said heterodyne beat signal and said absolute frequency information; and
a sweep rate correction module for correcting said measured spectrum information in response to said measured local oscillator frequency sweep rate information, wherein said measured spectrum information is corrected to account for non-uniformities in the frequency sweep rate of said swept local oscillator signal.

20. The system of claim 18 wherein said signal processor includes:
a sweep rate correction module for generating corrected local oscillator frequency information in response to said measured local oscillator frequency sweep rate information, wherein said corrected local oscillator frequency information accounts for non-uniformities in the frequency sweep rate of said swept local oscillator signal; and
a spectrum measurement module for generating said output signal in response to said heterodyne beat signal and said corrected local oscillator frequency information.

* * * * *